US007302260B2

(12) United States Patent
Blom et al.

(10) Patent No.: US 7,302,260 B2
(45) Date of Patent: Nov. 27, 2007

(54) COMMUNICATION NETWORK AND METHOD FOR IMPROVED RESILIENCE OF A MOBILE-TERMINATED CONNECTION

(75) Inventors: Vesa Blom, Pirkkala (FI); Juha Bäck, Helsinki (FI); Raili Numminen, Tampere (FI); Veikko Juusola, Tampere (FI)

(73) Assignee: Nokia Corporation, Espoo (FI)

( * ) Notice: Subject to any disclaimer, the term of this patent is extended or adjusted under 35 U.S.C. 154(b) by 95 days.

(21) Appl. No.: 10/880,498

(22) Filed: Jul. 1, 2004

(65) Prior Publication Data

US 2005/0192005 A1    Sep. 1, 2005

(30) Foreign Application Priority Data

Feb. 27, 2004  (GB)  ................... 0404410.3

(51) Int. Cl.
 *H04Q 7/20* (2006.01)
(52) U.S. Cl. ................... 455/432.1; 455/433; 455/435; 455/456; 709/249
(58) Field of Classification Search ............ 455/432.1, 455/432.2, 432.3, 433, 432, 435, 406, 456; 709/249
See application file for complete search history.

(56) References Cited

U.S. PATENT DOCUMENTS

| 6,408,182 | B1 * | 6/2002 | Davidson et al. ............ 455/433 |
| 6,731,934 | B1 * | 5/2004 | Mills et al. .................. 455/433 |
| 2002/0197991 | A1 * | 12/2002 | Anvekar et al. ............. 455/432 |
| 2004/0067735 | A1 * | 4/2004 | Lobley ....................... 455/41.2 |
| 2004/0157600 | A1 * | 8/2004 | Stumpert et al. ......... 455/432.1 |
| 2005/0010692 | A1 * | 1/2005 | Jain et al. ................... 709/249 |

FOREIGN PATENT DOCUMENTS

WO    WO 02/37866 A2    5/2002

\* cited by examiner

*Primary Examiner*—Joseph Feild
*Assistant Examiner*—Michael Vu
(74) *Attorney, Agent, or Firm*—Squire, Sanders & Dempsey L.L.P.

(57) ABSTRACT

A communication network is established by a connection to a user terminal that is capable of roaming amongst a plurality of serving areas. The network includes a controller for each serving area capable of routing a connection to a location covered by that serving area. If a controller serving the user terminal is faulty, a home database, which stores a plurality of identities of other controllers, is able to route the connection to the user terminal by selecting one of the other controllers that is valid.

13 Claims, 6 Drawing Sheets

COMMUNICATION NETWORK AND METHOD FOR IMPROVED RESILIENCE OF A MOBILE-TERMINATED CONNECTION

BACKGROUND OF THE INVENTION

1. Field of the Invention

The present invention relates to a communication network for establishing a connection to a user terminal and in particular, but not exclusively, to a user terminal that is capable of roaming amongst a plurality of serving areas in a wireless communication network.

2. Description of the Related Art

It is likely that at some point in the operational life of a communication network, that at least one of the elements is likely to fail resulting in unwanted downtime of the network. Therefore, network designers and telecommunication engineers are constantly striving to find mechanisms that will make a network more resilient to arbitrary failures. Broadly speaking, the elements of a wireless communication network are roughly grouped into being either radio access nodes (RAN) or core nodes (CN) as shown for example in FIG. 1. In practice, the core nodes could for example be MSC's (Mobile Switching Centres).

In practice, the RAN nodes can either take the form of a RNC (Radio Network Controller) in the case of UMTS (Universal Mobile Telecommunication System) network, or a BSC (Base Station Controller) also for GSM, etc.

The known network configuration shown in FIG. 1 has been described in the third generation standard having a specification number 3GPP TS 23.236 and which is entitled "Intra Domain Connection of RAN Nodes to Multiple CN Nodes".

FIG. 1 shows that the RAN elements are divided into RAN service areas 21, 22, 23, 24, 25, 26, 27, 28 and pool areas 6, 8, 11, 12. The RAN node service areas are also known as LA's (Location Areas), which is the coverage area controlled by the RAN node, i.e. typically an RNC or BSC. On the other hand, each of the pool areas is an area within which a mobile terminal (MT) may roam without needing to change the serving CN node. A pool area is served by one or more CN nodes in parallel. Thus, the configuration of FIG. 1 overcomes the strict hierarchy, which restricts the connection of a RAN node to just one CN node. That is, FIG. 1 shows the RAN node 22, as having a connection to multiple CN nodes, for example MSC1 and MSC4.

Although the 3GPP TS 23.236 standard offers improved redundancy in that a single RAN node can be connected to a secondary CN, this recovers only mobile originated (MO) operations. A mobile originated connection is one in which a call is set up after it has been initiated by a Mobile Station (MS) of the communication network. In contrast, a co-called mobile terminated (MT) call is a connection which has been set up to a MS (Mobile station) or user terminal of a communication network, but which was initiated by the communication network.

In the case of a MO connection using the configuration shown in FIG. 1, a RAN node can connect to a secondary MSC in the case that the primary MSC is not available. However, for a MT connection the situation is wholly different. In this case, the MS is not reachable if it is attached to a faulty MSC. In such a situation the call to the MS will fail. Moreover as the address of the faulty MSC remains in the home location register (HLR) of the network, subsequent MT calls will also fail. There is currently no solution to this problem. All the MT calls will fail until the subscriber makes a MO operation or a location update.

SUMMARY OF THE INVENTION

It is an aim of the embodiment of the present invention to improve the resilience of the communication network for a mobile terminated connection.

According to one aspect of the present invention there is provided a communication network for establishing a connection to a user terminal that is capable of roaming amongst a plurality of serving areas, the communication network comprising: a controller for each serving area capable of routing a connection to a location covered by that serving area; a home database for storing the identity of the controller normally selected to route the connection to the user terminal and for storing identities of other controllers whose service areas also cover the location of the user terminal; and means for selecting, in the case that the normally selected controller is determined to be invalid, from the other controllers whose identities are stored in the home database, at least one new controller which is valid, and establishing the connection to the user terminal via that new controller.

According to a further aspect of the present invention there is provided a method for establishing a connection to a user terminal that is capable of roaming amongst a plurality of serving areas of a communication network, wherein each of the service areas has a controller which is capable of routing a connection to a location covered by that serving area, the method comprising: storing in a home database the identity of the existing controller that routes the connection to the user terminals, and identities of other controllers whose service areas also cover the location of the user terminal; determining that the existing controller is invalid; selecting from the other controllers whose identities are stored in the home database, at least one other controller which is valid; and establishing the connection to the user terminal via the selected controller.

BRIEF DESCRIPTION OF THE DRAWINGS

For a better understanding of the present invention and to show how the same may be carried into effect, reference will now be made by way of example to the accompanying drawings, in which:

FIG. 1 illustrates the architecture of a multipoint wireless communication network which overcomes the traditional restriction of connecting a RAN node to only a single CN node. This restriction results from routing mechanisms in the RAN nodes which differentiate between information to be sent in the PS (Packet Switched) or the CS (Circuit Switched) domains, but do not differentiate between multiple CN nodes in each domain. However, the configuration of FIG. 1 allows the RAN nodes to connect to multiple CN nodes so as to allow information to be routed to different CN nodes in the CS or PS domains respectively.

DETAILED DESCRIPTION OF THE PREFERRED EMBODIMENTS

Figure 1:
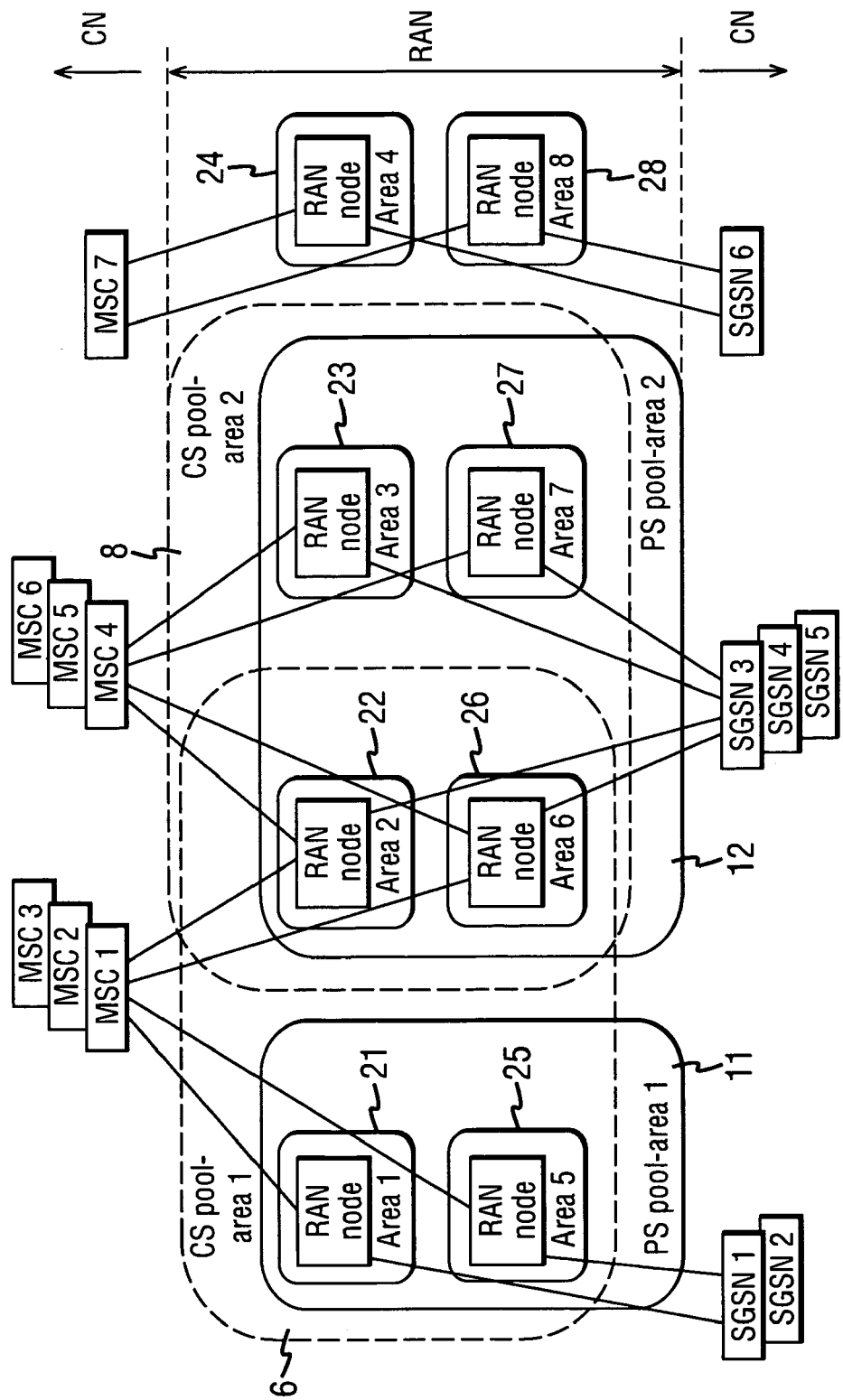
FIG. 1 shows an intra domain connection of RAN modes to multiple CN nodes.

Various different pool areas are shown in FIG. 1, for example FIG. 1 shows four different pool areas 6, 8, 11, 12, wherein each pool area comprises a collection of one or more RAN node service areas 21-25. Furthermore, each pool area is served by multiple CN nodes in parallel which allow traffic to be shared in the pool area between each other. In FIG. 1, the CN nodes are MSC1-MSC7.

In other words pool areas may overlap which is not possible for MSC (CN) service areas. FIG. 1 shows a first circuit-switched (CS) pool area 6 which comprises the RAN node service areas 21, 22, 25 and 26 which are served by MSCs 1, 2 and 3. A second CS pool area 8 is shown as comprising RAN nodes 22, 23, 26 and 27 to be served by MSCs 4, 5 and 6. A first packet-switched (PS) pool area 11 is shown as comprising the RAN nodes 21 and 25 which are served by SGSNs 1, 2. Also, a second PS pool area 12 is shown which comprises RAN nodes 22, 23, 26 and 27 served by SGSNs 3, 4 and 5. It should be appreciated that this is merely an example of the configuration of the pool areas, and different combinations can be expected.

Figure 2:
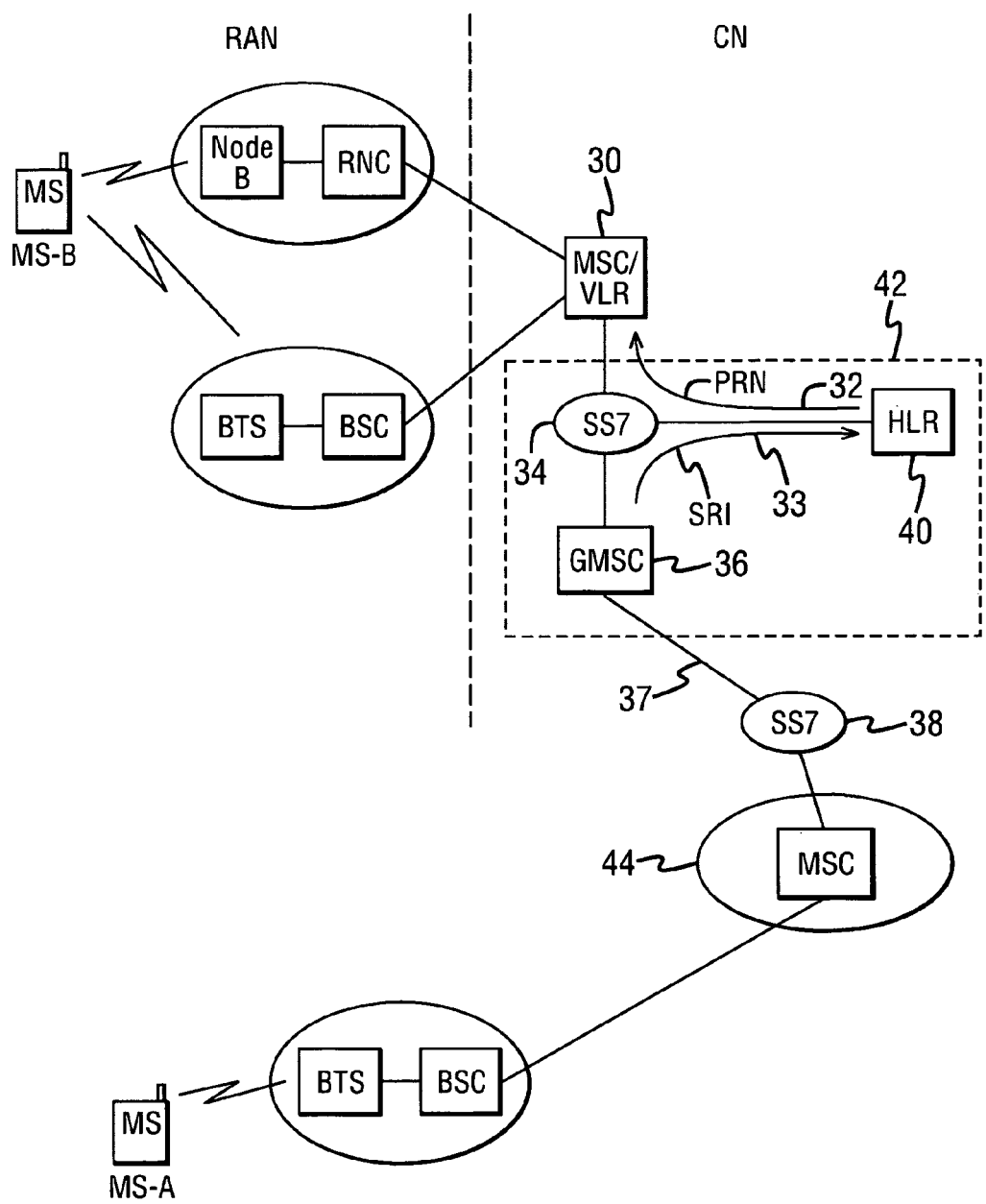
FIG. 2 shows a wireless communication network hierarchy including various elements according to an embodiment of the present invention.

FIG. 2 shows an example of various network elements which may be invoked from a mobile terminated call, i.e. for a call to be established to a MS of the communication network. A MS telephone number in a wireless network does not reveal the current location of the mobile phone, instead it is used to route a call to a certain mobile switching centre inside a wireless network, which is known as a gateway MSC (GMSC).

FIG. 2 specifically shows an example of a MT call, wherein an initiating subscriber MS-A attempts to initiate a call to a receiving subscriber MS-B, which may or may not be in a different wireless communication network. That is, MS-A is within a serving area, which is under the control of the serving MSC 44. The MS-A will for example, enter the mobile station number of MS-B. In response, the serving MSC 44 uses the number to a connect to a gateway MSC 36 of MS-A over, for example, a SS7 (Signalling System No. 7) signalling network 38. In particular, when a call attempt arrives, the GMSC 36 performs signalling during a call establishment phase with a HLR (Home Location Register) 40 associated with the subscriber of the MS, by sending a SRI (Send Routing Information) message to the HLR 40, for example over a SS7 signalling network 34, which is well known to those skilled in the art and beyond the scope of the present invention.

The HLR 40 then identifies MSC 30 which is presently serving MS-B and the HLR requests from MSC 30 a temporary routing number (MSRN) of MS-B. Having received this information, the GMSC is able to establish this leg of the call to the terminating MS and a call can be established between the calling party MS-A and the called party MS-B. FIG. 2 shows two alternative embodiments. That is, in the first embodiment, the RAN nodes consist of a Node B element and a RNC which are controlled by MSC 30. In the second embodiment, the RAN nodes consist of a BTS and BSC which are controlled by MSC 30.

Figure 3:
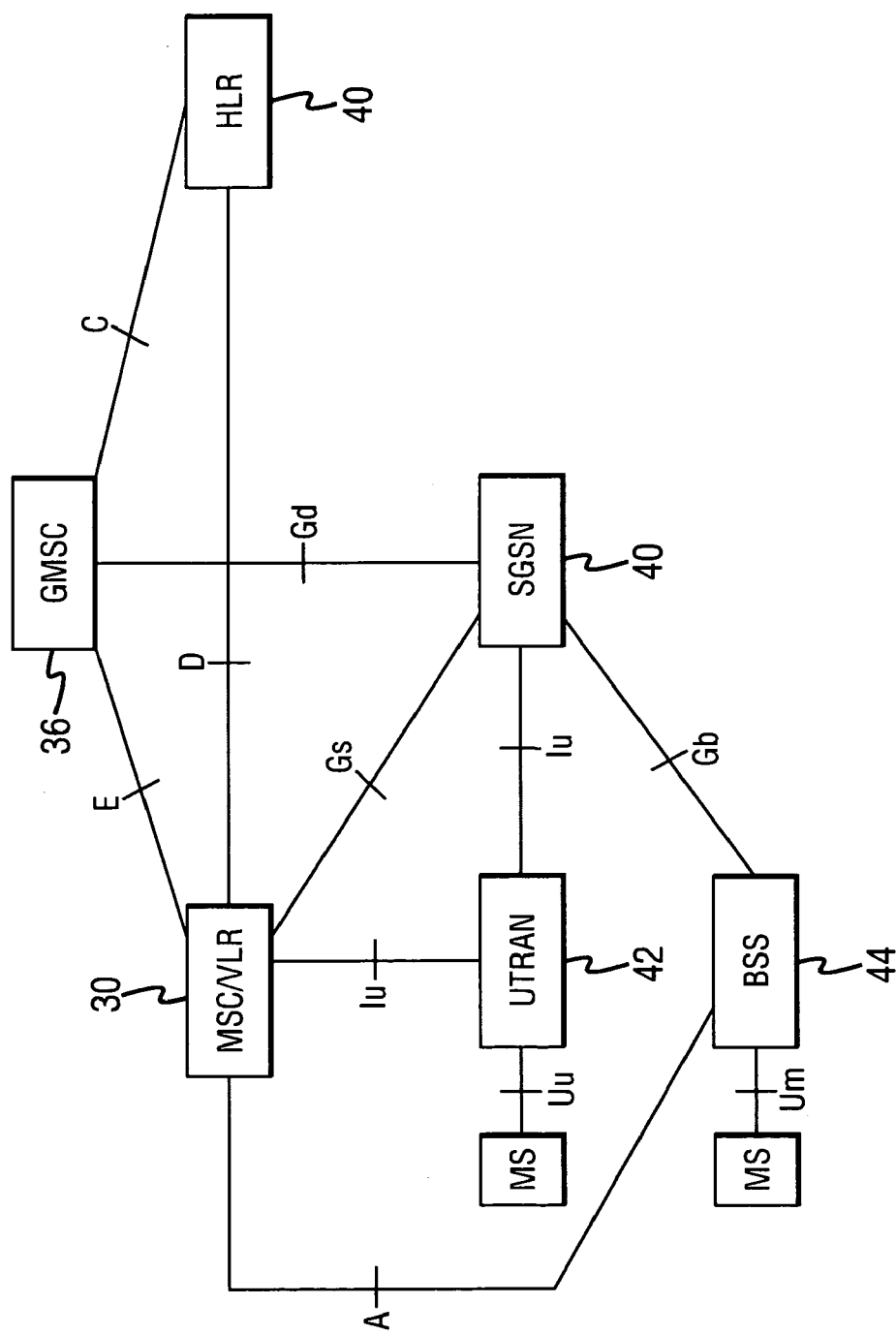
FIG. 3 shows a logical architecture in interfaces of elements of a wireless communication network according to an embodiment of the present invention.

At this point it is useful to refer to FIG. 3, which shows known interfaces between elements of a wireless communication network. FIG. 3 shows that the GMSC 36 is able to communicate with the HLR 40 over a C-interface. The HLR is a database which stores permanent information about the subscribers of a wireless communication network.

In contrast, the VLR (Visitor Location Register) 30, which is shown as being located within an MSC is a database which stores temporary information and is used by the serving MSC to service visiting subscribers. That is, when a subscriber enters a serving area controlled by a new MSC, a copy of all the necessary information is downloaded from the HLR to the relevant VLR. In this way, the serving MSC does not need to access the HLR directly for this information, which might in fact be present in a different communication network resulting in additional delay. Temporary information in the VLR is cleared whenever the MS roams out of an MSC's service area.

The GMSC 36 is the switching element that is responsible for routing a MT call to a called party and is able to communicate with the serving MSC 30 over the E interface and communicate with a SGSN 40 over a $G_d$ interface if required. The MSC 30 typically contains a VLR for storing temporary information associated with that serving area. The MSC/VLR 30 is able to communicate with a BSS (Base Station Subsystem) over an A-interface, with a UTRAN (UMTS Terrestial Radio Access Network) over an $I_u$-interface, and with the SGSN over a $G_S$-interface. The UTRAN 42 is able to communicate with the SGSN 40 also over an $I_u$-interface. The MS is able to communicate with either the UTRAN 42 or the BSS 44 with $U_u$ and $U_m$ interfaces respectively.

Broadly speaking, in order to establish a MT connection, the GMSC 36 receives from MS-A the phone number of MS-B to which the call is to be established, the GMSC then contacts the HLR 40 over the C interface. The HLR 40 knows the identity of the MSC which is presently serving the MS, since this identity is updated during a registration process which occurs either during power-up or on movement to a service area covered by another MSC. The HLR 40 in turn asks the relevant serving MSC, by sending a PRN (Provide Roaming Number) request message (FIG. 2), for a temporary routing number known as the MSRN (Mobile Station Routing Number) of the MS. That is, each MSC is able to assign an MSRN to a mobile terminal and stores a mapping from the MSRN to a unique identifier of the MS known as the IMSI (International Mobile Subscriber Identity). This mapping is temporarily stored in the VLR of the serving MSC.

The requested temporary number MSRN is then returned from the HLR back to the GMSC for setting up a call to the respective serving MSC. The serving MSC refers to the mapping table in its VLR to establish a connection to the MS.

Figure 4:
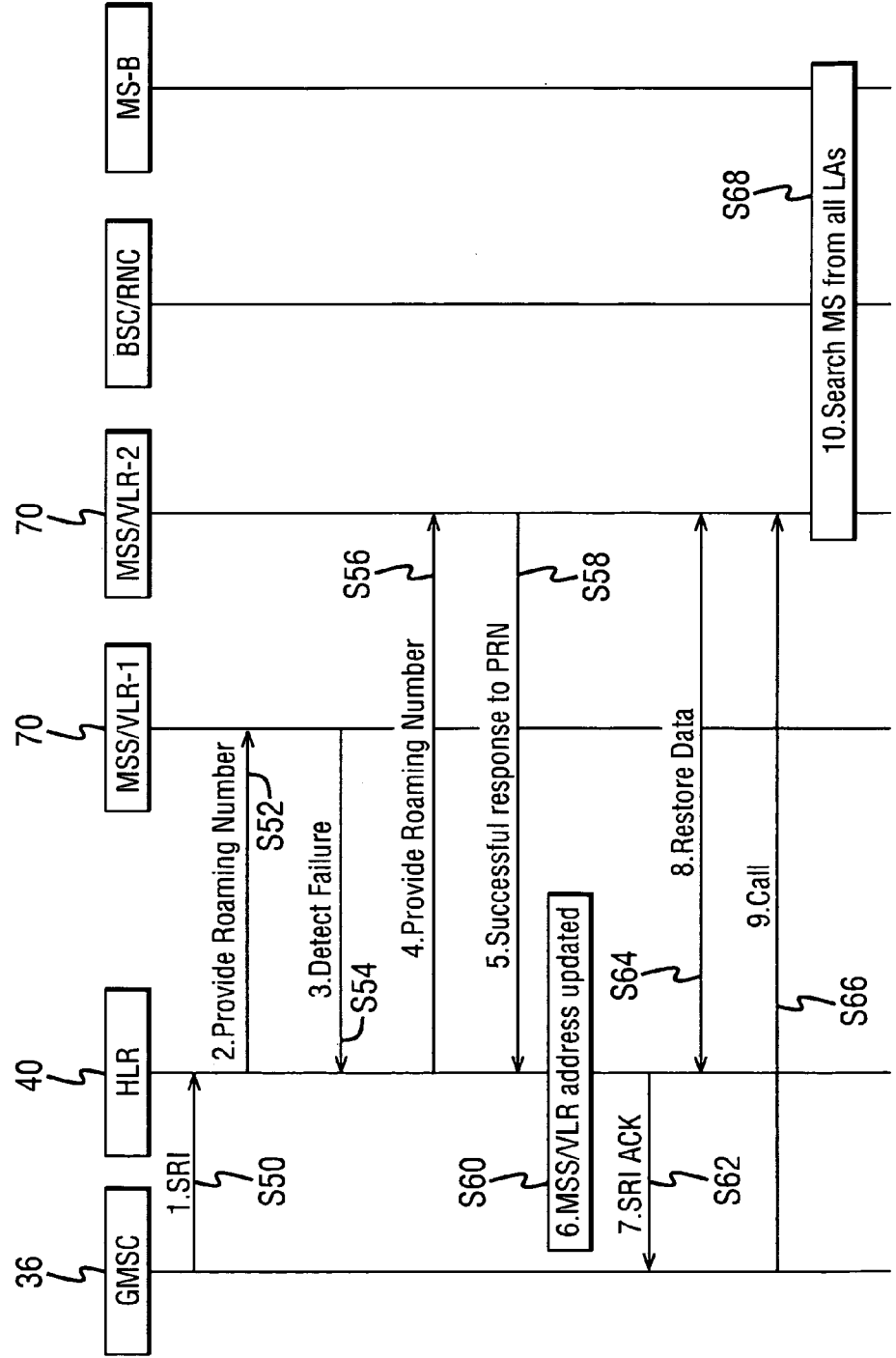
FIG. 4 shows a sequence of operations between the elements of the communication network according to an embodiment of the present invention.

FIG. 4 shows a flow chart indicating the signalling which is performed according to an embodiment of the present application to establish a connection to a MS. At step S50 a GMSC sends an SRI message to an HLR indicating that a MT call is trying to be set up to a MS. At Step 52 the HLR receives the SRI message and identifies from its database the address of the relevant MSC that is currently serving the MS. That is, the HLR sends a request for a temporary roaming number to the MSC which, according to its information, is currently serving the MS. It should be noted that in the following the terminology MSS is used instead of MSC in FIG. 4, since this is modern parlance for a particular component of the MSC. That is, the traditional MSC has evolved into two separate network elements, i) a MSC server (MSS) and ii) a media gateway (MGW). The MSS is responsible for call control and mobility management functions and is therefore the relevant part of the MSC shown in the other figures. The MSS is denoted 70, 70' in FIG. 4, in which reference 70 denotes a failed MSS and reference 70' denotes an operational MSS.

At step S54 it is detected that the serving MSS 70 has failed. It should be appreciated that there could be a variety of different ways of detecting a faulty serving MSC. For example, in one embodiment of the invention the faulty MSS 70 is detected by a timer in the HLR 40 such that if no response is received from the serving MSC within a certain time period such as 20 seconds, then the timer times out and it is assumed that the serving MSC has a fault. In an alternative embodiment, if the MSC is equipped with self-diagnostic software for example, then once a fault is detected, it can be reported to the HLR 40 via the SS7 network 34 for example. In this way, the HLR 40 could then be immediately updated to reflect that the serving MSC is faulty, which would result in a much faster recovery being performed since the HLR does not need to wait for a timeout to occur. In addition to storing the location of each serving MSC, it is a feature of the described embodiment of the invention that the HLR 40 also stores a pool area of other core nodes such as MSC's which have service areas that cover the location of the MS. Thus, at step S54 when it is detected by the HLR 40 that the serving MSS 70 has failed, it is able to look up its database for another MSS 70' which has a serving area that covers the location of the MS, and at step S56 the request for the roaming number is instead sent to this new MSS 70' which becomes the serving MSS. Step S58 shows that the new MSS 70' is valid (i.e. there is no failure) and returns a successful response to the HLR along with the temporary roaming number. At step S60 the HLR 40 is updated to reflect that the serving MSC is the new MSS 70', and not the old MSS 70 (which is invalidated in the HLR). At step S62, an SRI acknowledgement message is returned to the GMSC.

Upon receipt of the SRI acknowledgement message, the GMSC 36 is able to establish a call to the MS-B via the new MSS 70', wherein at step S64 the so-called RESTORE DATA service is invoked by the VLR-2 in MSS 70' after providing the roaming number to the HLR 40, either if the MS is unidentified in the VLR-2 or for a known MS whose IMSI (International Mobile Subscriber Identity) record is marked as "Not confirmed". The VLR-2 is therefore able to get the confirmed subscriber data from the HLR 40 using the RESTORE DATA which comprises MAP (Mobile Application Part) messages sent between the HLR 40 and the new MSS 70'. At step S66 a call is established between the GMSC 36 and the new MSS 70'. Thus, so long as the VLR supports the RESTORE DATA service, a further advantage of this embodiment of the invention is that no modifications are needed to the VLR.

Step S68 indicates that the called party MS-B is searched for by scanning all LAs (Location Areas) served by the new MSS 70'. A location area is the various RAN serving areas controlled by the new MSC 70'.

Figure 5:
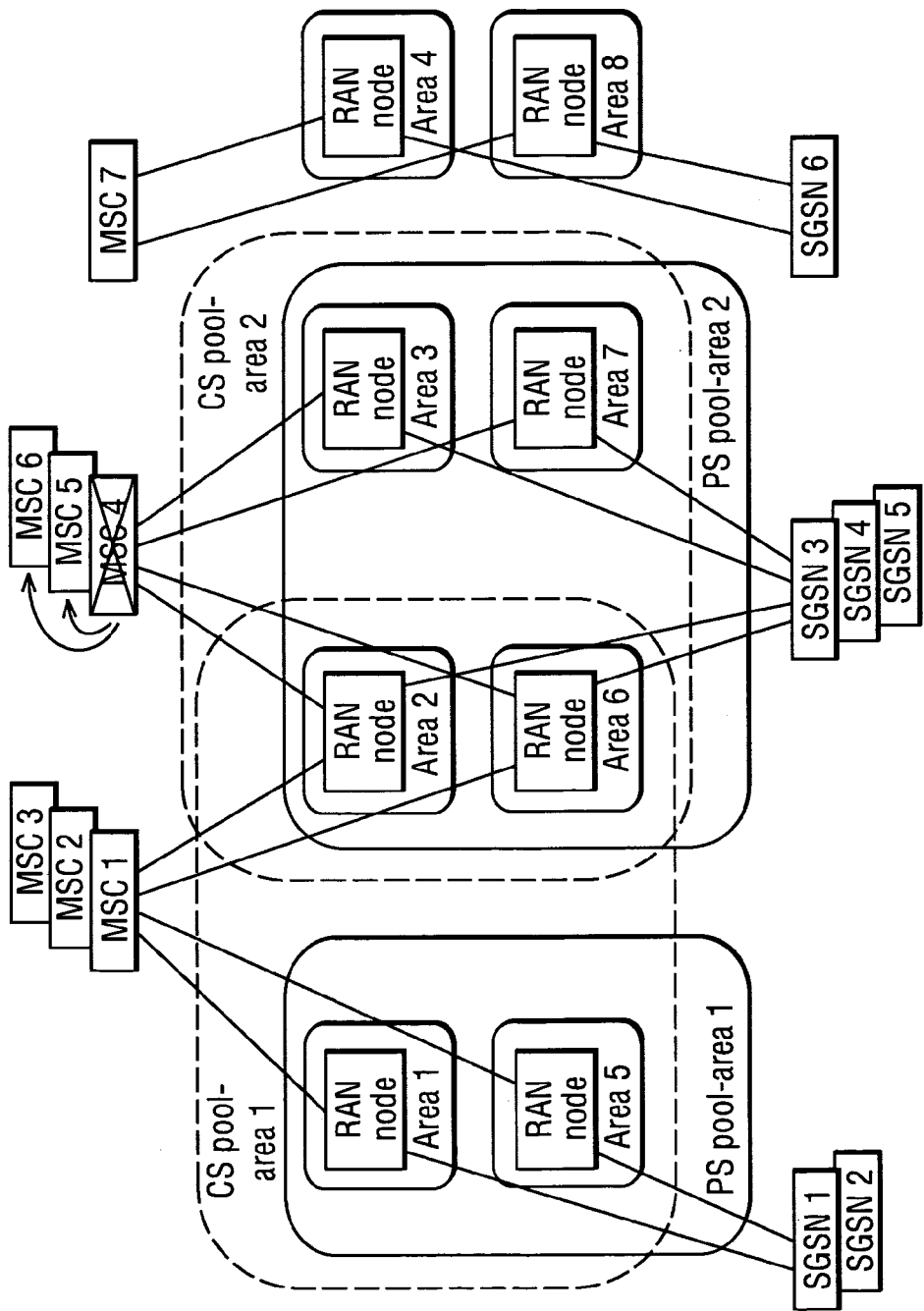
FIG. 5 shows the domain connections of RAN nodes to multiple CN nodes according to an embodiment of the present invention.

FIG. 5 shows the architectural implications of the above-described sequence where a call can be controlled by a different MSC if the serving MSC fails. That is, FIG. 5 shows that MSC 4 which controls the CS pool area 2 fails, but then the HLR according to an embodiment of the present invention is able to select a new MSC (i.e. either MSC 5 or 6) from the pool area set aside in the HLR for MT calls. For MO calls, instead if an MSC is lost, then a RAN node, i.e. a functionality contained in either an RNC or BSC is responsible for selecting a new MSC from its pool area associated with MO calls.

Figure 6:
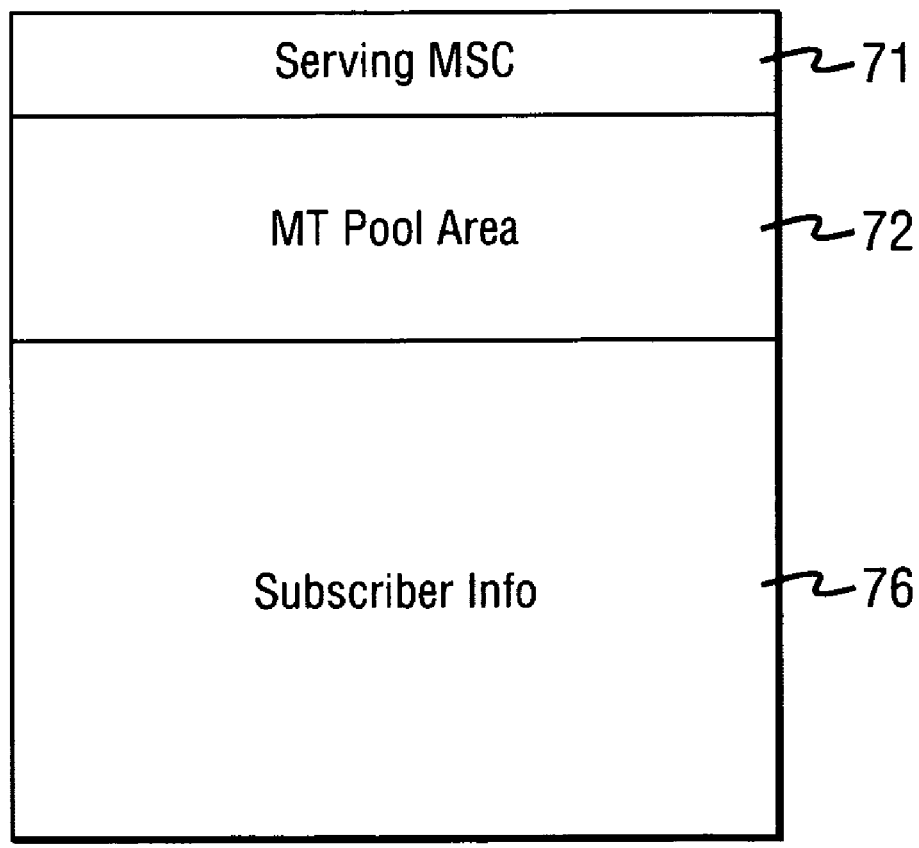
FIG. 6 shows the memory structure of an HLR database according to an embodiment of the present invention.

FIG. 6 shows an example of the database structure of the HLR 40 according to an embodiment of the present invention. That is, the HLR 40 is shown to comprise subscriber information 76, the identity or address 71 of the serving MSC 70 (i.e. the latest MSC to be registered with the HLR), and MT pool area 72 comprising the identities of other MSCs which have serving areas covering the location of the MS.

Typically, the number of core nodes in the pool is under ten and usually only two or three as shown in FIGS. 1 and 5. According to one embodiment of the present invention, the HLR is able to enable the next MSC in the MT pool area 72, to execute the PRN request message in the situation when the serving MSC identified in the address portion 71 of the HLR does not respond. It should be appreciated that the HLR can be provided with selection means for selecting which of the other MSCs in the pool area 72 should be selected as the new serving MSC. For example a prioritisation procedure could be implemented whereby one of the MSCs in the pool is selected over the others meeting a particular criteria or alternatively the HLR can merely sequentially poll each of the MSCs to execute the PRN request, and the first MSC in the pool area 72 which is able to do so shall be selected as the new serving MSC. In any event, once the HLR has found a valid MSC (i.e. one which has not failed) in the pool, then the HLR updates the identity of the serving MSC in area 71 of the HLR 40.

One of the advantages of the embodiments of the present invention is that the HLR is able to detect the failure of a serving MSC before a call is established, i.e. during the signalling phase when the GMSC is in communication with the HLR using SRI messages. This procedure is not evident to a calling part MS-A of the network. A call will be placed to a called party MS-B and will be routed via a valid MSC, invisibly to the calling party MS-A even where the serving MSC (as originally stored in the HLR database for that subscriber) has failed for whatever reason.

An MSC may fail as a result of a number of different reasons including natural disasters such as flood, fire, earthquake etc. Embodiments of the present invention improve call network resilience in cases where the serving MSC is lost and enables MT calls to be successfully routed to MS's even in the case when such an MSC is lost.

Another advantage of embodiments of the present invention is that the calling subscriber does not notice that something is wrong with the called subscriber.

A further advantage of embodiments of the present invention is that the recovery actions will concentrate only on those subscribers which are actually called. Thus, since the embodiments of the present invention enable a dynamic selection of a valid MSC during the call set up phase, it is not necessary to update any further information which reduces the burdensome load which can be expected of other solutions that might concentrate on updating all the subscribers attached to the failed MSC.

A further advantage of the present invention is that the solution requires no physical modifications to the MSC node itself, instead this is achieved within the HLR.

A further advantage of embodiments of the present invention arises from the fact that the identity of the failed MSC is replaced within the HLR by the new MSC. In contrast, in the past the address of the failed MSC remains in the HLR, which also causes subsequent MT calls to fail. It should be understood that the identities of each of the MSCs can be stored as addresses, for example using standard UMTS addressing which is well known and beyond the scope of the present invention.

It should be appreciated that although the term MS has been used to refer to the mobile station, any form of suitable user terminal may be used. For example, the user terminal can take the form of a PDA (Personal Digital Assistant), or other suitable hand-held device that is capable of receiving telecommunication services offered by the wireless network.

It should also be appreciated that although FIG. 2 shows for example SS7 networks 34, 38, any other suitable signalling system or communication format may be used.

The invention claimed is:

1. A communication network for establishing a connection to a user terminal that is capable of roaming amongst a plurality of serving areas, the communication network comprising:
a controller for each serving area capable of routing a connection to a location covered by a respective serving area; and
a home database configured to store an identity of the controller presently serving the user terminal which routes the connection to the user terminal and configured to store identities of other controllers whose service areas also cover a location of the user terminal, the home database comprising a selecting unit configured to select at least one new controller which is valid from the other controllers whose identities are stored in the home database, and establish the connection to the user terminal via the at least one new controller if the controller presently serving the user terminal is determined to be invalid, wherein the connection is a mobile terminated connection in that another user of the network initiates establishment of the connection via the network to the user terminal.

2. The communication network according to claim 1, wherein the connection is a packet switched connection capable of transferring data packets to the user terminal.

3. The communication network according to claim 1, wherein the connection is a circuit-switched connection capable of transferring radio frames to the user terminal.

4. The communication network according to claim 1, wherein the communication network comprises a wireless communication network.

5. The communication network according to claim 1, wherein the selecting unit updates the home database to reflect the at least one new controller.

6. The communication network according to claim 1, wherein the controller comprises a buffer for storing user data received from the home database whenever the user terminal roams into the respective serving area.

7. The communication network according to claim 1, wherein the controller comprises a database for storing data corresponding to a user of the user terminal whenever the user terminal roams into the respective serving area of the controller.

8. The communication network according to claim 1, wherein the controller comprises a mobile switching centre.

9. A method for establishing a connection to a user terminal that is capable of roaming amongst a plurality of serving areas of a communication network, wherein each of the service areas has a controller which is capable of routing a connection to a location covered by a respective serving area, the method comprising:
storing, in a home database, an identity of an existing controller presently serving the user terminal that routes a connection to the user terminal, and identities of other controllers whose service areas also cover a location of the user terminal;
determining that the existing controller presently serving the user terminal is invalid;
selecting, at the home database, at least one other controller which is valid from the other controllers whose identities are stored in the home database; and
establishing the connection to the user terminal via the selected at least one other controller, wherein the connection is a mobile terminated connection in that another user of the network initiates establishment of the connection via the network to the user terminal.

10. A database entity for use in a communication network to establish a connection with a user terminal that is capable of roaming amongst a plurality of serving areas, each serving area having a controller capable of routing a connection to a location covered by a respective serving area, the database entity comprising:
a storage unit configured to store an identity of a controller presently serving the user terminal which routes a connection to the user terminal and to store identities of other controllers whose service areas cover a location of the user terminal; and
a selection unit configured to select at least one new controller which is valid, from the other controllers whose identities are stored in the database entity if the controller presently serving the user terminal is determined to be invalid, and establish the connection to the user terminal via the at least one new controller, wherein the connection is a mobile terminated connection in that another user of the network initiates establishment of the connection via the network to the user terminal.

11. The database entity according to claim 10, wherein the database entity comprises a home location register.

12. An apparatus for establishing a connection to a user terminal that is capable of roaming amongst a plurality of serving areas of a communication network, wherein each of the service areas has a controller which is capable of routing a connection to a location covered by a respective serving area, the apparatus comprising:
storing means for storing, in a home database, an identity of an existing controller presently serving the user terminal that routes a connection to the user terminal, and identities of other controllers whose service areas also cover a location of the user terminal;
determining means for determining that the existing controller presently serving the user terminal is invalid;
selecting means for selecting, at the home database, at least one other controller which is valid from the other controllers whose identities are stored in the home database; and
establishing the connection to the user terminal via the selected at least one other controller, wherein the connection is a mobile terminated connection in that another user of the network initiates establishment of the connection via the network to the user terminal.

13. A database entity, comprising:
storage means for storing an identity of a controller presently serving a user terminal which routes a connection to the user terminal and for storing identities of other controllers whose service areas cover a location of the user terminal, the database entity being for use in a communications network to establish a connection with the user terminal that is capable of roaming amongst a plurality of serving areas, each of the serving areas having a controller capable of routing a connection to a location covered by a respective serving area; and means for selecting at least one new controller which is valid, from the other controllers whose identities are stored in the database entity if the controller presently serving the user terminal is determined to be invalid, and establishing the connection to the user terminal via the at least one new controller, wherein the connection is a mobile terminated connection in that another user of the network initiates establishment of the connection via the network to the user terminal.

* * * * *